3,830,763
AUTOXIDIZABLE MALEIC ADDUCTS OF FATTY ACID ESTERS OF DIPENTAERYTHRITOL AND TRIPENTAERYTHRITOL
John Gillan, Noble Park, Frederick John Lubbock, Beaumaris, and Livia Polgar, Caulfield, Victoria, Australia, assignors to Dulux Australia Ltd., Melbourne, Victoria, Australia
No Drawing. Filed Apr. 26, 1973, Ser. No. 354,916
Claims priority, application Australia May 9, 1972, 8,901
Int. Cl. C08g 17/16; C09d 3/64
U.S. Cl. 260—22 R            4 Claims

ABSTRACT OF THE DISCLOSURE

Novel autoxidizable maleic adducts of fatty acid esters of dipentaerythritol and tripentaerythritol are disclosed. The adducts are modified by reaction of the anhydride rings with monohydric alcohols to have the structure of succinyl half-esters. The compositions are of particular use as film-forming constituents of liquid paint compositions, which can have acceptable application properties at non-volatile contents of the order of 90% by weight. Particularly useful alcohols are acrylic alcohols such as hydroxyethyl methacrylate.

---

This invention relates to novel autoxidizable esters of polyols and drying oil fatty acids and to paint compositions comprising such esters.

The novel esters of his invention are fatty acid esters of dipentaerythritol and tripentaerythritol in which a portion of the combined fatty acids is present in the form of a maleic anhydride adduct modified to have the structure of a succinyl half ester of a monohydric alcohol. The esters are particularly useful as film-forming components of surface coatings.

According to the present invention we now provide a novel composition of matter consisting of an autoxidizable ester of a polyol selected from dipentaerythritol and tripentaerythritol in which the polyol is fully esterified with monocarboxylic drying oil fatty acids and further characterised in that (a) a portion of the said esterified fatty acids is converted to the maleic anhydride adduct thereof, the residual anhydride moiety of which adduct is further modified to have the structure of a succinyl acid half-ester in which the esterifying component is a monohydric alcohol consisting essentially of carbon, hydrogen and oxygen atoms and which has a maximum molecular weight of 150, and
(b) the autoxidizable ester comprises from 4 to 20% by weight of combined maleic anhydride.

When films of these novel esters are suitably catalysed, applied to the substarte and allowed to dry in contact with air, they autoxidize to give hard, tough films and are remarkly resistant to the well-known defects of skindrying and wrinkling at thick film builds. Theye are hence well-suited to use as film-forming constituents of paint compositions and because the esters are inherently of low viscosity they are particularly useful in providing paint compositions that can be applied to substrates by normal coating techniques, at very high non-volatile contents.

Accordingly, we further provide novel liquid paint compositions in which the film-forming component consists essentially of an autoxidizable ester of a polyol as hereinabove defined.

In one preferred embodiment, the paint composition which optionally contains pigment dispersed therein in conventional manner, has a non-volatile content of at least 90% by weight. Compositions of this type have the important attribute that their use substantially eliminates the release into the atmosphere of volatile amosphere-polluting organic solvents during the drying process. By way of contrast, a conventional paint may contain from 30–50% by weight of volatile organic solvents.

Our novel esters are most conveniently prepared from polyol which has been fully esterified with monocarboxylic drying oil fatty acids. The polyol itself may be either dipentaerythritol or tripentaerythritol. However, especially when we wish to prepare autoxidizable esters of low viscosity, e.g. as film-forming constituents of paints, we prefer to use either dipentaerythritol or dipentaerythritol admixed with a minor proportion, e.g. 0–15% by weight of tripentaerythritol. The mono-carboxylic drying oil fatty acids may be segregated or purified autoxidizable fatty acids. In general, however, it is unnecessary and economically unsound to use these and we commonly use mixtures of the acids as they occur naturally. Thus suitable fatty acids are, for example, the acids derived from linseed, tung, fish, safflower, soya and sunflower oils and tall oil fatty acids. Mixtures of such fatty acids may be used and in fact we have found that it is preferable not to use acids such as tung oil fatty acid alone but to blend it with at least 80% by weight of another fatty acid such as linseed fatty acid.

The esterification of a polyol with a fatty acid is a well-understood reaction and can be carried out by known methods of preparing the above polyol fatty acid esters.

The required weight porportion of maleic anhydride is then reacted with the ester to form adducts with a portion of the fatty acid residues thereof. Adduct formation takes place at temperatures as low as 80° C. with conjugated fatty acids such as tung oil fatty acids, but temperatures of 200–230° C. are preferred when working with less reactive fatty acids. It is known that the double bond of the maleic anhydride is involved in this adduct formation, leaving the residual unopened anhydride ring attached to the fatty acid chain but free to take part in a subsequent chemical reaction. It is our understanding that at the permitted maleic anhydride concentration of 4–20% by weight combined maleic anhydride in the autoxidizable ester, on average about 0.7–3.5 fatty acid residues per ester molecule take part in adduct formation.

The residual anhydride moiety is modified to the form of a succinyl acid half-ester by reacting it with monohydric alcohol, which opens the anhydride ring to form concurrently both the required ester and a carboxyl group. The concentration of monohydric alcohol and reaction conditions must be selected to prevent esterification of the carboxyl group derived from the opened anhydride ring. This is particularly important when the esters of the invention are to be used in paint compositions, as their rate of curing in air has been observed to fall markedly with increasing loss of the succinyl half-ester structure. Typical reaction conditions are temperatures of 100–110° C. and using approximately stoichiometric concentrations of anhydride moieties and monohydric alcohols.

Bearing in mind that the esterifying alcohol must have a maximum molecular weight of 150, suitable alcohols are, for example, the saturated alcohols methanol, ethanol, propanol, butanol and their higher homologues, benzyl and furfuryl alcohols.

The alcohol need not, however, be a saturated alcohol and alcohols containing ethylenic unsaturation may be used. Suitable alcohols of this type are, for example, allyl alcohol. In particular, we have found that acrylic alcohols, for example, hydroxyethyl methacrylate, hydroxypropyl methacrylate and the hydroxy acrylates were found to have a surprising synergistic effect on the curing rate of our esters and when this is a desirable property, for example in paint compositions, they are our preferred esterifying alcohols.

As mentioned above, our novel autoxidizable esters, when suitably catalysed, dry in contact with air to form hard, tough films. The catalysts required are organo-metallic compounds well-known as oleoresinous paint driers. Thus, suitable catalysts are, for example, lead, cobalt, manganese and calcium naphthenate. The concentrations we use follow the normal practice of oleoresinous and oil-modified alkyd resin drier technology.

When the autoxidizable esters are to be used as film-forming constituents of paint compositions, they may be pigmented by dispersing therein conventional pigment particles in known manner. Optionally the viscosity of the paint compositions may be adjusted by the addition of solvents for the esters, for example aliphatic and aromatic hydrocarbons and blends thereof.

Alternatively the viscosity of the paint compositions may be adjusted by using autoxidizable drying oils, particularly those synthesised from dipentaerythritol and drying oil fatty acids, in place of solvents. This allows very high nonvolatile contents to be attained.

The invention is illustrated by the following examples in which all parts are expressed by weight.

EXAMPLE 1

The preparation of an autoxidizable ester according to the invention, its incorporation as a film-forming constituent in a paint composition and the comparison of this paint composition with a commercially available alkyd-based enamel. The combined maleic anhydride content of the ester is approx. 5% by weight.

The novel autoxidizable ester according to the invention was prepared in several stages.

(a) Preparation of the polyol fatty acid ester

The following materials were charged into a flask fitted with a stirrer, thermometer and azeotropic distillation condenser.

| | Parts |
|---|---|
| Dipentaerythritol | 254 |
| Safflower oil fatty acid | 1680 |
| Zinc oxide | 1.6 |
| Xylene | 104 |

The ingredients were gradually heated to a maximum temperature of 220° C. in a nitrogen atmosphere and water was distilled off. This heating was maintained until the acid value of the resin fell below 1.0 mgm. KOH/gm.

The resultant product had an acid value of 0.7 mgm. KOH/gm. and a viscosity as measured by a cone and plate viscometer of 1.0 poise at 25° C.

(b) Preparation of maleinised polyol fatty acid ester

The following materials were charged into a flask fitted with a stirrer and thermometer.

| | Parts |
|---|---|
| Polyol fatty acid ester (from stage (a)) | 1200 |
| Maleic anhydride | 60 |

The temperature was raised to 210° C. and held there for 3 hours. The cone and plate viscosity of the product was 7.1 poise at 25° C. and the uncombined maleic anhydride content less than 0.1%.

(c) Preparation of half-ester

The following ingredients were charged into a flask fitted with a stirrer, thermometer and condenser.

| | Parts |
|---|---|
| Maleinised polyol fatty acid ester (from stage (b)) | 1260 |
| Hydroxyethyl methacrylate | 80 |
| Armeen DMCD [1] | 0.1 |

[1] A tertiary amine catalyst—"Armeen" is a registered trademark.

The ingredients were heated to 100° C. for one hour. The product had no residual anhydride groups as evidenced by the absence of anhydride absorption peaks at wave numbers of 1850 and 1786 cm.$^{-1}$ in the infrared spectra, and had a cone and plate viscosity of 10.5 poise at 25° C.

A paint composition was prepared from the autoxidizable ester produced by the above process. To 100 parts of the ester, 75 parts of titanium dioxide were added and the two components blended by conventional ball milling. Additional materials such as driers and antiskinning agents were added in art-recognised quantities and the cone and plate viscosity of the composition was adjusted to 3 poise at 25° C. with mineral turpentine.

A 250 micron film of the paint composition was applied to a glass panel and allowed to air-dry.

The film was tested for:
    (a) touch-dry time;
    (b) through dry, after 24 hours;
    (c) through-dry after one week; and
    (d) wrinkling Overnight through-dry and through-dry after one week were assessed on a points scale which ranged from 0 points (very soft) to 10 points (complete, firm through-dry). Wrinkling was assessed by its degree e.g. nil, severe.

A film of a commercially available gloss alkyd enamel (based on a 64% soya oil pentaerythritol phthalic anhydride alkyd) designed for architectural use was spread and tested in identical fashion and the comparative results are shown below:

| Film former | Weight percent solids | Touch-dry time (hrs. mins.) | Through-dry 24 hrs. | Through-dry One week | Wrinkling |
|---|---|---|---|---|---|
| Autoxidizable ester | 74 | 1.30 | 8 | 10 | Nil. |
| Alkyd | 69 | >8 | 0 | 3 | Nil. |

It can be seen from the above results that the paint composition prepared from the autoxidizable ester according to the invention was superior in almost every respect to the alkyd enamel. The alkyd enamel was satisfactory when applied to a substrate in a thin film e.g. 50 micron, but at high film builds, deficiencies in drying properties were apparent, and a thick film of the alkyd enamel would have to be applied in two or more coats. The paint composition based on the autoxidizable ester did not suffer from these drying deficiencies and a thick film could therefore be applied in one coat, with all the attendant advantages that this brings.

In a further series of tests, three additional autoxidizable esters according to the invention were prepared but using in each a different drying oil fatty acid as a direct weight replacement for the safflower oil fatty acids. The additional materials tested were soya, sunflower and tall oil (less than 1% by weight resin acids) fatty acids. The results, when tested as pigmented paints as described above were generally similar to those obtained with the safflower oil, although the tall oil fatty acids composition was noticeably slower in reaching the touch-dry state.

EXAMPLE 2

Preparation of autoxidizable esters according to the invention using a number of different alcohols to form the half-ester.

The preparation of a number of autoxidizable esters was carried out according to the method of Example 1, but with the hydroxyethyl methacrylate replaced by chemically equivalent amounts of:

(a) benzyl alcohol
    (b) allyl alcohol
    (c) butyl alcohol
    (d) dodecyl alcohol All other details of the preparations were identical.

The resulting autoxidizable esters were processed into paint compositions and tested according to the methods of Example 1. The hydroxyethyl methacrylate paint composition and the alkyd enamel of Example 1 were included in the following comparison:

| Alcohol | Weight percent solids | Touch-dry time (hr. mins.) | Through-dry 24 hrs. | Through-dry One week | Wrinkling |
|---|---|---|---|---|---|
| Benzyl | 83 | 3.30 | 0 | 7 | Nil. |
| Allyl | 82 | 2.30 | 0 | 7 | Nil. |
| Butyl | 84.5 | 2.30 | 0 | 7 | Nil. |
| Dodecyl | 83.5 | 5.00 | 0 | 5 | Bad. |
| Hydroxyethyl methacrylate. | 74.0 | 1.30 | 8 | 10 | Nil. |
| Alkyd enamel | 69.0 | >8 | 0 | 3 | Nil. |

The composition based on the ester utilising dodecyl alcohol (molecular weight 170) was clearly unsatisfactory whereas compositions based on esters utilising benzyl, butyl and allyl alcohols had properties which were superior to the alkyd enamel of Example 1. The compositions based on the ester utilising the preferred hydroxyethyl methacrylate showed a marked superiority over all the other compositions. It was confirmed by a further experiment that hydroxypropyl methacrylate compositions gave substantially the same results as did those containing hydroxyethyl methacrylate. The above results demonstrate our preferment that when the novel compositions are used in paint compositions, the alcohols should have a molecular weight of under 150 and should be acrylic in nature.

EXAMPLE 3

Preparation of autoxidizable esters according to the invention using different concentrations of maleic anhydride in the esters.

A number of autoxidizable esters were prepared from dipentaerythritol, safflower oil fatty acid, maleic anhydride and allyl alcohol according to the method of Example 1 the esters differing in that each had incorporated therein a different concentration of maleic anhydride which was converted to a half-ester by a chemically equivalent amount of allyl alcohol. The concentrations of maleic anhydride used were 2½%, 5%, 10% and 20% by weight of the total weight of maleinised ester.

The esters were processed into paint compositions and tested according to the methods of Example 1 and the results were as follows:

| Weight percent maleic anhydride | Weight percent solids | Touch-dry time (hr. mins.) | Through-dry 24 hrs | Through-dry One week | Wrinkling |
|---|---|---|---|---|---|
| 2½ | 89.5 | 3.00 | 0 | 2 | Bad. |
| 5 | 82.0 | 2.30 | 0 | 7 | Nil. |
| 10 | 79.5 | 2.40 | 5 | 7 | Very slight. |
| 20 | 74.0 | 3.00 | 4 | 5 | Nil. |

The paint compositions containing the ester with 2½% maleic anhydride was markedly inferior to the other coating compositions which utilised levels of maleic anhydride which lie within the scope of the invention.

EXAMPLE 4

Preparation of an autoxidizable ester using tripentaerythritol, its incorporation into a paint composition and the comparison of this paint with the paint composition and alkyd enamel of Example 1.

The following materials were charged into a flask equipped with stirrer, thermometer and azeotropic distillation condenser

| | Parts |
|---|---|
| Tripentaerythritol | 372 |
| Safflower oil fatty acid | 2240 |
| Zince oxide | 2.2 |
| Xylene | 150 |

The ingredients were heated to 215° C. and 100 parts water removed.

The remainder of the preparation was similar to the preparation of Example 1.

The ester was processed into a paint composition and tested according to the methods of Example 1. In the results below, it was compared with the dipentaerythritol-based paint composition and the alkyd-based enamel from Example 1.

| Film former basis | Weight percent solids | Touch-dry time (hr. mins.) | Through-dry 24 hrs | Through-dry One week | Wrinkling |
|---|---|---|---|---|---|
| Tripentaerythritol | 87.0 | 2.45 | 0 | 5 | Medium. |
| Dipentaerythritol | 74.0 | 1.30 | 8 | 10 | Nil. |
| Alkyd | 69.0 | >8 | 0 | 3 | Nil. |

The tripentaerythritol-based composition was comparable with the alkyd-based enamel but was inferior to the dipentaerythritol-based composition of Example 1.

EXAMPLE 5

Preparation of autoxidizable esters using fatty acids other than safflower oil fatty acid. Two autoxidizable esters were prepared from dipentaerythritol, 5% maleic anhydride and allyl alcohol according to the method of Example 1 but substituting different fatty acids in place of the safflower oil fatty acid. The acids used were:

(a) safflower oil fatty acid in which 20% of the safflower oil fatty acid has been replaced by tung oil fatty acid
(b) linseed oil fatty acid.

The esters thus prepared were incorporated in paint compositions and tested with a safflower oil fatty acid-containing paint composition according to the methods of Example 1. The results were as follows:

| Fatty acid | Weight percent solids | Touch-dry time (hr. mins.) | Through-dry 24 hrs | Through-dry One week | Wrinkling |
|---|---|---|---|---|---|
| Safflower/tung | 71.5 | 2.10 | 5 | 7 | Slight. |
| Linseed | 85.0 | 3.00 | 0 | 7 | Nil. |
| Safflower | 82.0 | 2.30 | 0 | 7 | Nil. |

All the compositions exhibit similar properties with the exception of that one containing tung oil fatty acid which is conjugated and allows faster drying at the expense of slight wrinkling. All three were suitable for use in thick films.

EXAMPLE 6

In this example it is shown that only the half-ester gives the advantageous properties of the coating compositions disclosed in this invention.

An autoxidizable ester was prepared from dipentaerythritol, safflower oil fatty acid, 5% maleic anhydride and butyl alcohol according to the method of Example 1. A sample was taken from each stage of the reaction. These samples were processed into paint compositions and tested according to the methods of Example 1.

The samples taken were of (a) dipentaerythritol/safflower fatty acid ester
(b) maleinised dipentaerythritol/safflower fatty acid ester.
(c) butyl half-ester of maleinised dipentaerythritol/safflower fatty acid ester.
(d) In addition, the preparation was continued to give the diester of the maleinised dipentaerythritol/safflower fatty acid ester.

The diester was prepared by heating 100 parts of the butyl half-ester of the maleinised ester with 3.5 parts butylene oxide at 100° C. for 3 hours. The diester was also processed into a paint composition and tested according to the methods of Example 1.

A further example was prepared in which the preferred dipentaerythritol was replaced by the chemically equivalent amount of monopentaerythritol and this preparation was continued to the butyl half-ester stage according to the method of Example 1. The autoxidizable ester thus formed is designated (e) in the following table of results. This autoxidizable ester was processed into a paint composition and tested according to the methods of Example 1.

The results are shown below:

| Sample | Weight percent solids | Touch-dry time (hr. mins.) | Through-dry 24 hrs | Through-dry One week | Wrinkling |
|---|---|---|---|---|---|
| (a) | 90 | 5.30 | 0 | 0 | Severe. |
| (b) | 85 | 5.00 | 0 | 0 | Do. |
| (c) | 84.5 | 2.30 | 0 | 7 | Nil. |
| (d) | 85 | 2.30 | 0 | 2 | Slight. |
| (e) | 88 | 6.00 | 0 | 0 | Severe. |

The samples (a) and (b) and (e) exhibited very poor film-forming properties. The sample (c) which is an ester according to the invention exhibited excellent film-forming properties but these were reduced rather than enhanced by progression to the diester (d). It can thus be seen that only autoxidizable esters according to the invention give satisfactory film-forming properties.

We claim:
1. A composition of matter consisting of an autoxidizable ester of a polyol selected from dipentaerythritol and tripentaerythritol in which the polyol is fully esterified with monocarboxylic drying oil fatty acids and further characterised in that
  (a) on average 0.7–3.5 of the said esterified fatty acids per ester molecule is converted to the maleic anhydride adduct thereof, the residual anhydride moiety of which adduct is further modified to have the structure of a succinyl acid half-ester in which the esterifying component is a monohydric alcohol consisting essentially of carbon, hydrogen and oxygen atoms and which has a maximum molecular weight of 150, and
  (b) the autoxidizable ester comprises from 4 to 20% by weight of combined maleic anhydride.
2. A composition according to claim 1 wherein the monohydric alcohol is an acrylic alcohol.
3. A liquid paint composition comprising a film-forming component which consists essentially of an autoxidizable ester of a polyol according to claim 1.
4. A liquid paint composition according to claim 3 in which the monohydric alcohol is an acrylic alcohol.

References Cited
UNITED STATES PATENTS

| | | | |
|---|---|---|---|
| 3,253,928 | 5/1966 | Hunt | 260—18 Cl |
| 2,945,830 | 7/1960 | Kraft | 260—22 M |
| 2,444,328 | 6/1948 | Blair | 260—18 Cl |
| 3,699,065 | 10/1972 | Clark | 260—22 R |
| 2,423,230 | 7/1947 | Eilerman | 260—18 Cl |
| 3,366,563 | 1/1968 | Hart et al. | 260—18 Cl |

DONALD E. CZAJA, Primary Examiner

R. W. GRIFFIN, Assistant Examiner

U.S. Cl. X.R.

117—124 E, 161 K; 260—22 M, 33.6 R, 40 R